Sept. 27, 1932.   L. J. VOORHEES   1,879,595
BATTERY BOX
Filed May 15, 1928
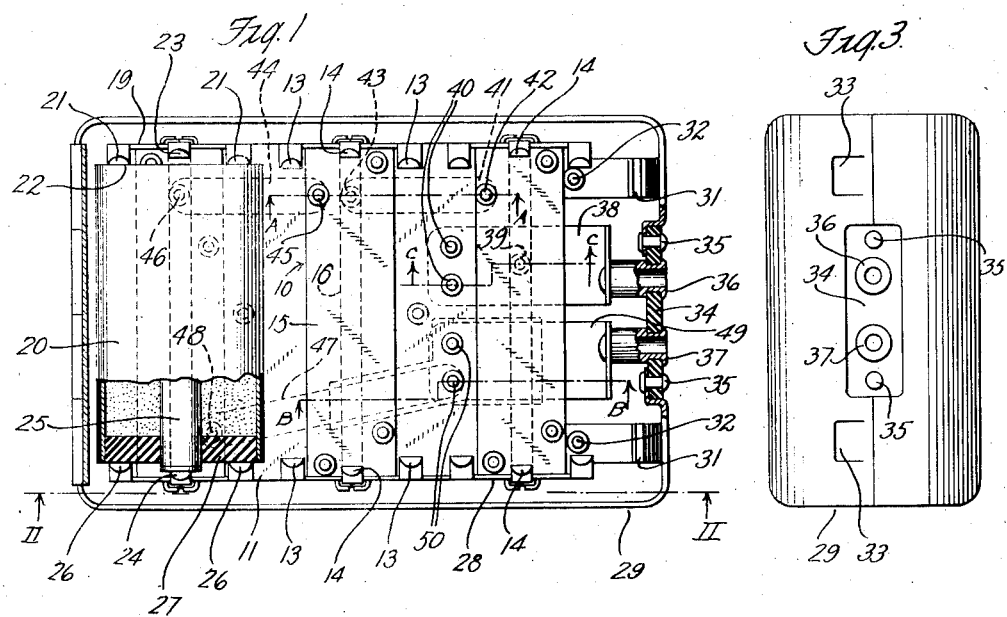
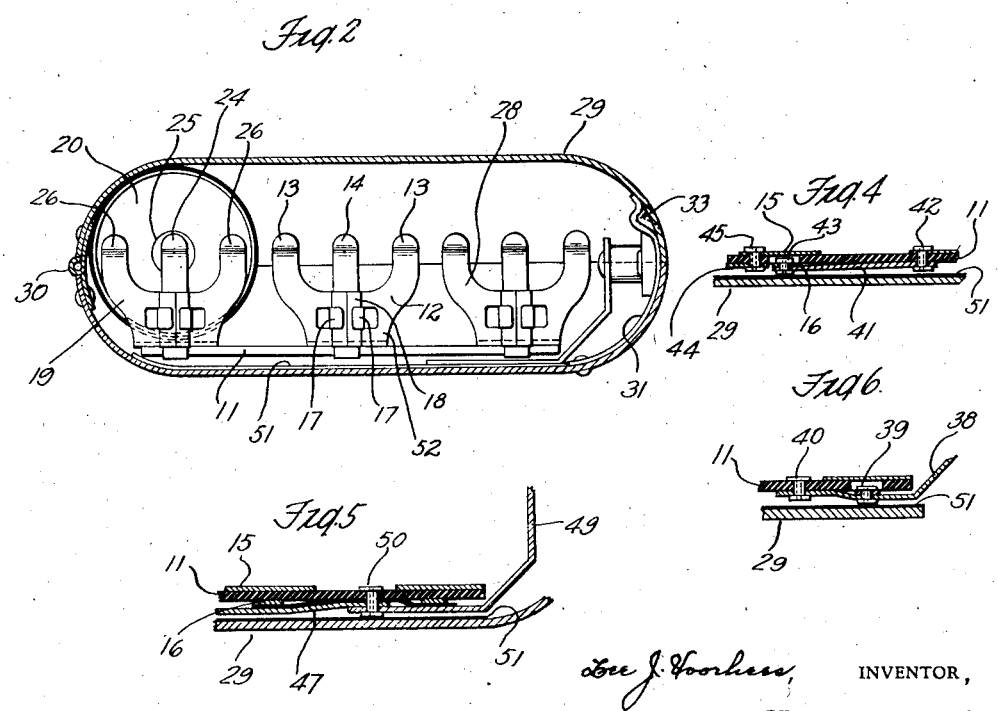
INVENTOR,
Lee J. Voorhees,
BY
ATTORNEYS.

Patented Sept. 27, 1932

1,879,595

UNITED STATES PATENT OFFICE

LEE J. VOORHEES, OF LONG ISLAND CITY, NEW YORK, ASSIGNOR TO NATIONAL CARBON COMPANY, INC., A CORPORATION OF NEW YORK

BATTERY BOX

Application filed May 15, 1928. Serial No. 277,837.

This invention relates to battery boxes adapted to hold flashlight cells, and more specifically to means for supporting such cells in such a device and for connecting them in circuit.

Flashlight cells are frequently supported in battery boxes by means of conductive spring clips in which the cells must be inserted in a certain position or they will be connected in circuit in opposing relation. This condition is further aggravated in certain classes of service where the polarity of the circuit is important, as there the cells must all be in correct relation to the circuit as well as in correct relation to each other. As a result of these conditions devices using miniature dry cells are often unjustly criticized as faulty or condemned as useless when the trouble is caused by cells improperly inserted by the user. Therefore, one of the objects of this invention is a flashlight cell clip that automatically connects a cell to a circuit in a certain predetermined polarity when the cell is inserted in the clip either end around. Another object of this invention is a battery box containing several of these clips so arranged that the flashlight cells may be inserted in the clips either end around and the clips will automatically connect the cells in correct polar relation to each other and to a circuit. Other aims and objects will be apparent from the following description and illustration.

The objects of this invention are attained by means of the mechanism shown in the accompanying illustration, in which:

Fig. 1 is a plan view of a battery box with the top broken away showing the interior mechanism and a flashlight cell in one of the cell clips.

Fig. 2 is a view along the line II—II of Fig. 1.

Fig. 3 is a right end view of the battery box shown in Fig. 1.

Fig. 4 is a fragmentary sectional view along the line A—A of Fig. 1.

Fig. 5 is a fragmentary sectional view along the line B—B of Fig. 1, and

Fig. 6 is a fragmentary sectional view along the line C—C of Fig. 1.

In the drawing the flashlight cell clip 10 is mounted on a sheet of insulation 11 that may be of any suitable material such as fiber or bakelite. The clip 10 comprises two opposed groups of resilient upstanding conductors cut and formed from flexible sheet metal between which a flashlight cell may be inserted. Each of these groups is composed of a bifurcated conductor 12 having two prongs 13 that are adapted to make contact with the bottom of a flashlight cell container casing, and a central conductor 14 located between the prongs 13 and adapted to make contact with the central brass terminal at the top of a battery cell. The conductors 12 are joined by a connecting strip 15 that may be integral with the conductors 12 for convenience in manufacture or it may be any other convenient means of electrically connecting the conductors 12. The conductors 14 are likewise joined or connected by a strip 16.

The conductors 12 and 14 in each group are held together by two ears 17 that are cut from the conductor 12 and bent part way around the conductor 14 thereby holding it to the conductor 12, but the conductors are insulated from each other by a sheet of flexible insulating material 18 such as paper or fiber that is wrapped around the conductor 14 where it is clamped to the conductor 12 by the ears 17. For convenience in manufacture and assembly the connecting strip 15 that joins the conductors 12 is located on top of the insulating sheet 11, and the connecting strip 16 that joins the conductors 14 is located under or on the bottom of the insulating sheet 11 so the conductors 12 and connecting strip 15 are insulated from the conductors 14 and the connecting strip 16.

A conductor 12 with its two prongs 13 and a conductor 14 attached to it form a group. Two groups with their connecting strips 15 and 16 form a clip into which a flashlight cell may be inserted with either end toward either group and the positive and negative terminals of the cell will be automatically connected to certain portions of a circuit of which the clip is a part regardless of the position of the cell in the clip.

The distance between the conductors in one group and those in the other group of the same clip may be called the clipping distance. The cell contacting portions of the conductors 12 and 14 in each group are not in alignment as the conductor 14 is positioned back of the prongs 13 of the conductor 12 so the clipping distance between the central conductors 14 is greater than the clipping distance between the prongs 13 of the bifurcated conductors 12. It is this arrangement of the conductors in the groups that permits a cell to be inserted in a clip either end about and be connected in a circuit in a certain manner regardless of its position. The method by which a clip connects a cell in a circuit to accomplish this result is illustrated at the left of Fig. 1, where a clip 19, which is a duplicate of clip 10, is shown with a flashlight cell 20 therein.

The conductors 21 are in contact with the bottom 22 of the metallic container casing and negative electrode of the flashlight cell 20. The central conductor 23 is not in contact with the bottom 22 of the cell 20 because it sets back away from the cell a short distance. The central conductor 24 at the other end of the clip 19 is in contact with the positive electrode 25 at the center of the battery 20, and the conductors 26 are resting against the insulating battery sealing material 27. The conductors 21 and 26 are connected together and to one part of a circuit, and the conductors 23 and 24 are connected together and to the other part of a circuit. Therefore, the negative terminal 22 of the cell 20 is connected to the conductors 21 and 26 and to one part of the circuit, and the positive terminal 25 is connected to the conductors 23 and 24 and to the other part of the circuit. When the position of the cell 20 in the holder 19 is reversed, the negative terminal 22 will still be connected to the conductors 21 and 26, and the positive terminal 25 will still be connected to the conductors 23 and 24 so the cell is therefore connected to the circuit in the same manner and polarity as it was before it was reversed. Therefore, the polarity of the cell in the circuit is determined by the way the clip is connected in the circuit.

In addition to the two clips 10 and 19 a third and duplicate clip 28 is also mounted on the insulating sheet 11. Surrounding the assembly of clips on the insulating sheet 11 is a battery box 29 comprising complementary halves that are joined at one end by the hinge 30 and latched together at the opposite end by the springs 31 that are joined to one half of the box by the rivets 32 and are bent and formed so they snap over the catches 33 that are formed in the other half of the box.

A block 34 of insulating material is secured in an opening in one end of the battery box 29 by means of the rivets 35. Two hollow terminals 36 and 37 adapted to receive standard metal cord tips are supported by the block 34 in the opening in the battery box 29 so cord tips or other wire terminals may be inserted in the hollow terminals 36 and 37 without opening the box 29.

The terminals 36 and 37, and the clips 10, 19, and 28 are electrically connected so that when a battery cell is inserted in each of the clips the cells will be in series in a circuit that terminates at the terminals 36 and 37. A metallic connecting strip 38 is riveted to the terminal 36 and is also attached to the strip connecting the central conductors 14 of the clip 28 by means of the rivet 39. The strip 38 is also attached to the insulating sheet 11 by means of the rivets 40. A metallic connecting strip 41 is attached to the strip connecting the bifurcated conductors of the clip 28 by means of the rivet 42, and to the connecting strip 16 of the clip 10 by means of the rivet 43. A metallic connecting strip 44 is attached to the connecting strip 15 of the clip 10 by means of the rivet 45, and to the strip connecting the conductors 23 and 24 of the clip 19 by means of the rivet 46. A metallic connecting strip 47 is attached to the strip connecting the conductors 21 and 26 of the clip 19 by means of the rivet 48. A connecting strip 49 is riveted to the terminal 37, and the strips 47 and 49 are attached together by one of the rivets 50 that hold the strip 49 to the insulating sheet 11. A thin sheet of insulating material 51 located between the parts assembled on the sheet 11 and the box 29 insulates the clips and connecting strips from the box 29.

With the clips connected as shown and described flashlight cells may be inserted in each either end around and they will be connected in series with their positive poles toward the terminal 36 and their negative poles toward the terminal 37. The number of clips shown is not imperative as one or more may be used and they may be connected so that the cells are either in series or parallel and in either polarity with relation to the terminals or other apparatus.

The strength or stiffness of the clips is so proportioned by the shape or form of the component parts that when the cell contacting portions, such as the prongs 13, are forced apart by the insertion of a long cell in the clip, such as that shown at 10, that the flexible conductor 12 will bend mostly in the narrow section 52 near the point where the groups join the insulating sheet 11 and below the point where the conductors 12 and 14 are connected. By this unique arrangement of the parts of the clips it is possible to use flashlight cells having a relatively large variation in length as the flat bottom of a long cell will not force the prongs 13 of a conductor 12 back and make contact with the central conductor 14, thereby short circuiting the cell, because the conductor 14 is carried back with the conductor 12 so that the prongs 13 and the conductor 14 maintain their relative position.

The battery box shown and described herein is adapted to be carried in the pocket or on the person of the user and employed to energize portable electrical apparatus such as that used by persons with impaired hearing. The cell clips are not limited to this particular class of service but may be employed to adapt flashlight cells to other classes of service such as supplying the grid biasing current to electron tubes in radio sets where the polarity of the circuit is important. By equipping radio sets with these clips a manufacturer could be sure the batteries would always be properly connected. The clips are also especially adapted for use in hand lamp and lantern cases, miner's lamps, physician's and oculist's illuminating instruments, advertising devices, and military aiming lights.

I claim:

1. A battery cell clip comprising opposed groups of conductors adapted to receive a battery cell therebetween in either of two positions; each of said groups having a conductor in alignment with the axis of said cell for making electrical connection with one terminal thereof in one of said positions; and a conductor out of alignment with the axis of said cell for making electrical connection with the other terminal thereof in the other of said positions; each conductor in one of said groups being in electrical connection with the corresponding conductor in the other of said groups and also with one side of a circuit so that a cell is in said circuit in a predetermined polarity when in said clip in either of said positions.

2. A battery cell clip comprising opposed groups of conductors adapted to receive a battery cell therebetween in either of two positions; each of said groups having a conductor in alignment with the axis of said cell for making electrical connection with one terminal thereof in one of said positions; a conductor out of alignment with the axis of said cell for making electrical connection with the other terminal thereof in the other of said positions; and means for electrically connecting each conductor in one group with the conductor in the other group in alignment therewith.

3. A battery cell clip comprising opposed groups of conductors adapted to receive a battery cell therebetween in either of two positions; each of said groups having a conductor adapted for being flexed by one terminal of said cell in one of said positions; a conductor adapted for being flexed by the other terminal of said cell in the other of said positions; and means for maintaining the relative position of said conductors during flexure; each conductor in one of said groups being in electrical connection with the corresponding conductor in the other of said groups and also with one side of a circuit so that a cell is in said circuit in a predetermined polarity when in said clip in either of said positions.

4. A battery cell clip comprising opposed groups of conductors adapted to receive a battery cell therebetween in either of two positions; each of said groups having a conductor at one point along said cell for making electrical connection with one terminal thereof in one of said positions; and a conductor at another point along said cell for making electrical connection with the other terminal thereof in the other of said positions; each conductor in one of said groups being in electrical connection with the corresponding conductor in the other of said groups and also with one side of a circuit so that a cell is in said circuit in a predetermined polarity when in said clip in either of said positions.

5. A battery cell clip comprising opposed groups of conductors adapted to receive a battery cell therebetween in either of two positions; each of said groups having a conductor at one point along said cell for making electrical connection with one terminal thereof in one of said positions; a conductor at another point along said cell for making electrical connection with the other terminal thereof in the other of said positions; and means for electrically connecting each conductor in one group with the corresponding conductor in the other group.

6. A battery cell clip comprising opposed groups of conductors adapted to receive a battery cell in two positions; each of said groups comprising a conductor adapted to make contact with the positive terminal of said battery cell in one of said positions and a conductor adapted to make contact with the negative terminal of said battery cell in the other of said positions; said conductors adapted to make contact with said positive terminal being connected, and said conductors adapted to make contact with said negative terminal being connected.

7. A battery cell clip comprising opposed groups of conductors adapted to receive a cylindrical battery cell therebetween; each of said groups comprising a bifurcated conductor having cell-contacting portions in a plane transverse to the axis of such cell when in said clip, and a conductor having a cell-contacting portion out of said plane in a direction away from such cell.

8. A battery cell clip comprising opposed groups of conductors adapted to receive a battery cell therebetween; each of said groups comprising a bifurcated flexible conductor having cell contacting portions in a plane transverse to the axis of such cell when in said clip, and a conductor having a cell contacting portion out of said plane in a direction away from such cell; said conductors being arranged so they move together and remain out of alignment when flexed by the insertion of a battery cell.

9. A battery cell clip comprising two groups of conductors adapted to receive a battery cell therebetween in two positions; each of said groups comprising a conductor adapted to make contact with the positive terminal of said battery cell in one of said positions and a conductor adapted to make contact with the negative terminal of said battery cell in the other of said positions; and means electrically connecting each conductor in one group with the corresponding conductor in the other group.

10. A battery cell clip forming part of a circuit and comprising opposed groups of conductors adapted to receive a cylindrical dry battery cell longitudinally therebetween in either of two positions to energize said circuit; each of said groups comprising a bifurcated conductor with prongs adapted to make contact with one terminal of said cell in one of said positions, and a conductor between but out of alignment with said prongs adapted to make contact with the other terminal of said cell in the other of said positions; said conductors being arranged so the energy in said circuit remains unchanged when the position of such cell in said clip is reversed.

11. The combination with a battery box comprising complementary portions hinged and latched together, of a pair of terminal sockets attached to said box, a plurality of battery cell clips within said box, and a circuit including said terminal sockets and said battery cell clips; each of said clips comprising opposed groups of conductors adapted to receive a cylindrical dry battery cell longitudinally therebetween in two positions, each of said groups having a conductor in alignment with the axis of said cell for making connection with one terminal in one of said positions, and a conductor out of alignment with the axis of said cell for making connection with the other terminal in the other of said positions; and means for connecting each conductor in one group with the corresponding in the other group.

12. The combination with a battery box comprising complementary portions hinged and latched together, of a pair of terminal sockets located within said box but accessible through an opening in said box; a plurality of battery cell clips within said box, and means connecting said terminal sockets and said battery cell clips in circuit; each of said clips comprising opposed groups of conductors adapted to receive a cylindrical dry battery cell longitudinally therebetween in two alternative positions to energize said circuit; each of said groups comprising a bifurcated conductor with prongs adapted to make contact with one terminal of said cell in one of said positions, and a conductor between said prongs adapted to make contact with the other terminal of said cell in the other of said positions; said conductors being arranged so said cell energizes said circuit in the same polarity when in said clip in either of said positions.

13. A battery cell clip comprising opposed groups of conductors adapted to receive a battery cell therebetween in either of two positions; each of said groups having a conductor in alignment with the axis of said cell and at one point therealong for making electrical connection with one terminal of said cell in one of said positions; a conductor out of alignment with the axis of said cell and at another point therealong for making electrical connection with the other terminal of said cell in the other of said positions; and means for electrically connecting each conductor in one group with the corresponding conductor in the other group.

14. A battery cell clip comprising a formed sheet of metal having forked ends turned upward and adapted to receive a battery cell therebetween in two positions and make contact with one terminal thereof in either of said positions; and a strip of metal insulated from said sheet and having an upturned end located in each fork for making contact with the other terminal of said cell in either of said positions.

15. A clip for holding a flashlight cell in either of two endwise positions, comprising the combination of contact means for making electrical connection with the positive terminal of said cell in either of said positions; and contact means for making electrical connection with the negative terminal of said cell in either of said positions.

16. A clip for holding a flashlight cell in either of two endwise positions, comprising the combination of contact means for making electrical connection with the positive terminal of said cell in either of said positions; contact means for making electrical connection with the negative terminal of said cell in either of said positions; means for mechanically holding one of said contact means to the other to form said clip; and means for electrically insulating one of said contact means from the other.

17. A clip for holding a flashlight cell in either of two endwise positions, comprising the combination of connected contact means for making electrical connection with the positive terminal of said cell in either of said positions; connected contact means for making electrical connection with the negative terminal of said cell in either of said positions; means comprising part of one of said contact means for holding said contact means together; and means for electrically insulating one of said contact means from the other.

18. A clip for holding a flashlight cell in either of two endwise positions, comprising the combination of contact means at each end thereof for making electrical connection with the positive terminal of said cell in either of said positions; contact means at each end thereof for making electrical connection with the negative terminal of said cell in either of said positions; and means for electrically insulating one of said contact means from the other.

19. A clip for holding a flashlight cell in either of two endwise positions, comprising the combination of connected contact means at each end thereof for making electrical connection with the positive terminal of said cell in either of said positions; connected contact means at each end thereof for making electrical connection with the negative terminal of said cell in either of said positions; means for mechanically holding said contact means together to form said clip; and means for electrically insulating said contact means one from the other.

20. A clip for holding a flashlight cell in either of two endwise positions, comprising, the combination of means for connecting the positive terminal of said cell to the positive side of a circuit in either of said positions, and means for connecting the negative side of said cell to the negative side of a circuit in either of said positions.

In testimony whereof, I affix my signature.

LEE J. VOORHEES.